United States Patent [19]
Pritchard

[11] 3,798,778
[45] Mar. 26, 1974

[54] ORBITAL AND ENTRY TRACKING ACCESSORY FOR GLOBES

[75] Inventor: Edgar B. Pritchard, Norfolk, Va.

[73] Assignee: The United States of America as represented by the Administrator of the National Aeronautics and Space Administration, Washington, D.C.

[22] Filed: Nov. 29, 1971

[21] Appl. No.: 202,750

[52] U.S. Cl. ................................ 33/1 SA, 33/46 R
[51] Int. Cl. ............................................ G01c 21/00
[58] Field of Search ........ 33/1 SA, 1 R, 1 SC, 21 B; 35/46 R, 34

[56] References Cited
UNITED STATES PATENTS

| 812,408 | 2/1906 | Dickerson | 33/1 SA |
| 2,671,270 | 3/1954 | Richardson | 33/1 SA |
| 2,183,765 | 12/1939 | Coleman | 35/34 X |

FOREIGN PATENTS OR APPLICATIONS

| 149,293 | 3/1904 | Germany | 35/34 |
| 339,255 | 4/1936 | Italy | 35/46 R |

Primary Examiner—William D. Martin, Jr.
Attorney, Agent, or Firm—Howard J. Osborn; Wallace J. Nelson; John P. Manning

[57] ABSTRACT

An orbital and entry tracking accessory or attachment is arranged to be mounted on a globe to provide a rapid means of determining range requirements for entry vehicles returning from any orbit to any desired landing site with reasonable accuracy. The device preferably is constructed of clear plastic strip material, and comprises a support ring, a calibrated orbital track member rigidly carried by the support ring, and a calibrated lateral range member pivotally coupled to the support ring at points such that the lateral range member is always oriented normally to the orbital track member. The assembly is mountable on the globe relatively snugly, but freely movably. At least one of the members has a detachable coupling so as to permit placement of the device on a globe. With the device mounted on a globe, and the orbital track member located to simulate a desired orbital track, the lateral range member can be pivotally moved into alignment with a desired landing site on the globe, and the calibrations on the two members permit ready determination of the longitudinal and lateral range requirements from any point of entry along the orbital track.

4 Claims, 4 Drawing Figures

PATENTED MAR 26 1974

INVENTOR.
EDGAR B. PRITCHARD

BY

ATTORNEY

ORBITAL AND ENTRY TRACKING ACCESSORY FOR GLOBES

The invention described herein was made by an employee of the United States Government and may be manufactured and used by or for the government for governmental purposes without the payment of any royalties thereon or therefor.

FIELD OF THE INVENTION

This invention relates to attachments for globes, and particularly to such attachments useful for educational purposes in illustrating the motion of satelites relative to the earth, and such devices useful in determining and/or illustrating the entry ranging requirements of space vehicles returning from any orbit to any desired landing site, with reasonable accuracy.

BACKGROUND AND SUMMARY OF THE INVENTION

In space technology and operations, when an orbiting vehicle is to be returned to Earth, it is necessary to determine the entry ranging requirements of the vehicle from its point of entry to the desired landing site. This information is necessary, for instance, in the determination of the powered or aerodynamic maneuvering necessary to guide the vehicle from the entry point to the landing site. It is also useful and necessary in determining which of several possible landing sites may be the most feasible. Generally, prior methods of determining or defining ranging requirements, particularly laterally, for entry vehicles returning from any orbit to any desired landing site have required solution of the orbital equations of motion for return to a site, either by hand or by a computer program. In general, this has been relatively time consuming, and has required calculations to be carried out for all possible landing sites before the range requirements could be defined for the site or group of sites which are most desirable in terms of ranging requirements.

The general purpose of this invention is to provide a globe attachment or accessory which facilitates a rapid determination of the entry ranging requirements for entry vehicles returning from any orbit to any desired landing site with reasonable accuracy. Thus, the instant invention permits lateral range requirements to be determined to an accuracy of perhaps 30 nautical miles in much less time than the time required to calculate such requirements, for instance, in less than one-tenth the time required for such calculations. The invention also provides a rapid means whereby non-attractive sites, in terms of range requirements, can be visually eliminated without the necessity for any calculations. Additionally, the invention, because of its economy of manufacture and ease of use and understanding, is useful for educational purposes to illustrate the motion of satelites relative to the Earth, as well as to illustrate the entry ranging requirements of space vehicles.

The foregoing purposes and advantageous features have been achieved in accordance with the invention through an accessory which can be mounted on a globe, and which can simulate on the globe the orbital track of an orbiting vehicle. The accessory includes a lateral range member which is mounted such that it can be moved along the orbital track but will always be oriented normally thereto. In other words, the great circles of the orbital track member and the lateral range member will always be in normal planes such that the shortest distance to the orbital track of any point lying on the lateral range member will always be along the great circle of the lateral range member. The lateral range member is calibrated for measurement of circumferential distance, and thus provides a ready measurement of the lateral ranging requirement necessary for an orbiting vehicle to move to any landing site laterally removed from its current orbit. Preferably the orbital track member is rigidly carried by a support ring of substantially the same radius, and such that their great circles always lie in relatively normal planes. This facilitates orientation of the orbital track member to any desired orbit. The lateral range member preferably is pivotally mounted on the support ring at points 90° removed from the support points of the orbital track member. One of the members, such as the orbital track member, has a releasable or detachable coupling so as to facilitate mounting and dismounting of the device on or from a globe. The entire device preferably is constructed of clear plastic strip material, and thus manufacture is very economical. When both the orbital track member and the lateral range member are calibrated in terms of circumferential distances, the device readily provides both longitudinal and lateral ranging requirements from any entry point to any desired landing site.

Other and further purposes, advantages and features of the invention will become apparent from the ensuing description of a preferred embodiment of the invention, taken in conjunction with the accompanying drawings.

DESCRIPTION OF THE PREFERRED EMBODIMENT

Figure 1:
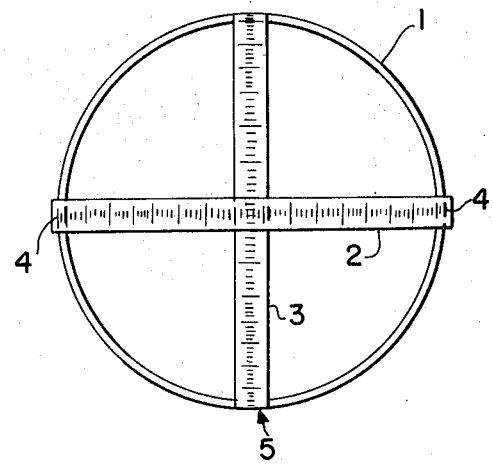
FIG. 1 is a top view of a preferred embodiment of the invention.
Figure 2:
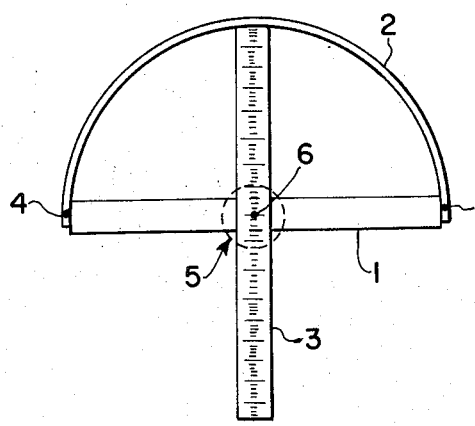
FIG. 2 is a front elevation view of the device of FIG. 1.
Figure 3:
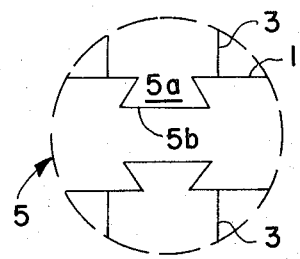
FIG. 3 is a detailed view of the area indicated by a broken line circle in FIG. 2.

Referring to the drawings, a support ring 1, of circular configuration, has mounted thereon a circular member 3 which will be referred to as an orbital track member, but which is actually a combined orbital track and longitudinal range finder. Orbital track member 3 is coupled to support ring 1 relatively rigidly such that they move together and such that their great circles are always normal to each other. To facilitate mounting the device on a globe, one or more of the joints or couplings 5 between orbital track member 3 and support ring 1 is formed as a releasable or detachable joint or coupling. An exemplary such joint or coupling is shown in FIG. 3, which is a detailed view of the area encircled by the broken line in FIG. 2. As shown in FIG. 3, orbital track member 3 has at least one free end formed with a projecting portion 5a to mate with a cut-out portion 5b in support ring 1. Portion 5a of orbital track member 3 is a squeeze fit in cut-out 5b such that the free end of member 3 can be detached to allow for placement of the device around a globe, and then recoupled to support ring 1. Although FIG. 3 shows orbital track member 3 as having two free ends formed in this matter, it is only necessary that one of the ends be free and detachable.

A lateral range member or lateral range finder 2 is pivotally coupled to support ring 1 through simple pin joints at points ninety degrees removed from the support ring connections of orbital track member 3. Thus, the great circle of lateral range member 2 is always normal to the great circle of orbital track member 3 regardless of its pivotal orientation about pin joints 4.

The entire device preferably is constructed of clear plastic stripping, a clear plastic of one sixteenth inch thickness being entirely suitable. Orbital track member 3 and lateral range member 2 are calibrated to measure circumferential distances along great circles of the globe, the calibrated markings designating either nautical miles or circumferential degrees. The midpoints of the intersections between orbital track member 3 and support ring 1 preferably include marks or the like 6 to facilitate location of these points along the equator of the globe.

In use of the device, with the device placed on a globe, points or marks 6 are located on the equator at the desired orbital nodal points for any particular point of initiation of the analysis. The orbital track 3, together with the support ring 1, is then rotated about points 6—6 to the desired orbital inclination. Lateral range finder 2 is then rotated about its pin joints 4 until the lateral range line thereon passes through the desired landing site. The lateral range to the site is obtained by measuring from the orbital track line along the center of orbital track member 3 to the landing site. Subsequent orbital passes can be studied by appropriate shifts of the nodal line 6—6 along the equator.

Figure 4:
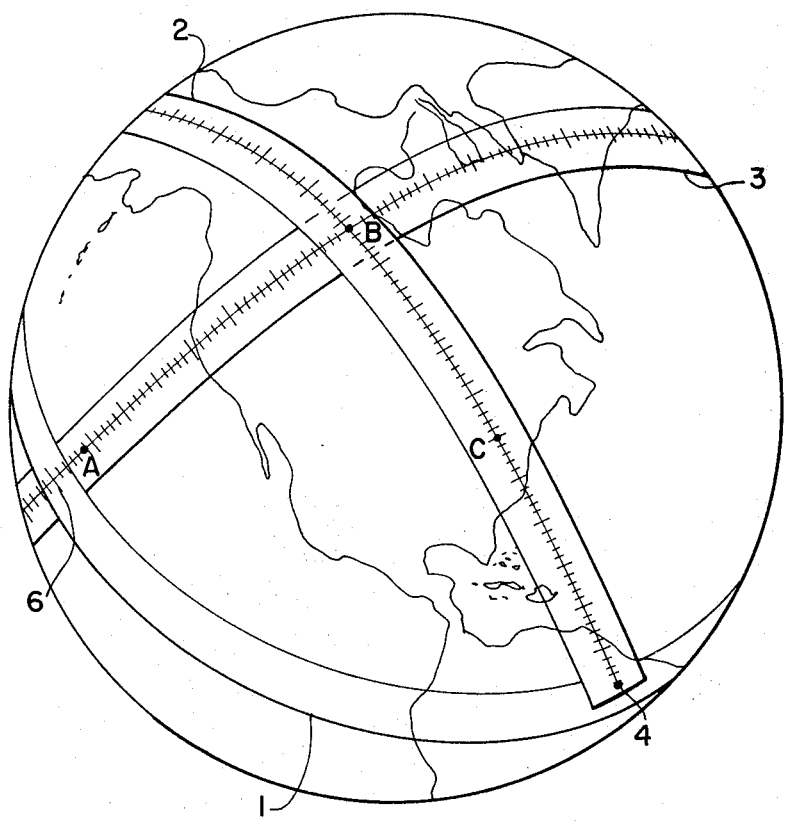
FIG. 4 is a perspective view of the preferred embodiment mounted on a globe.

FIG. 4 illustrates very clearly the operation of the device as a longitudinal and lateral range finder. Thus, in FIG. 4 point A is the entry point of the vehicle along the orbital track. Point C is the desired landing site. The longitudinal range requirement is measured from A to B, and the lateral range requirement is measured from B to C.

It will be readily understood that the preferred embodiment illustrated and described herein may be modified in various ways in keeping with the invention and that the invention itself need not take the precise form of this preferred embodiment. For instance, detachable coupling 5 may take other forms and be at other locations, so long as it permits ready placement of the device on a globe. If desired, an angular scale could be inscribed or marked about points 6 so as to facilitate orientation of orbital track member 3 to the desired orbital inclination relative to the equator. Additionally, a slidable tongue-and-groove joint could be provided on the facing surfaces of orbital track member 3 and lateral range member 2 to avoid any possibility of, for instance, their calibrated markings being relatively relocated.

I claim:

1. An orbital and entry tracking accessory for globes comprising an orbital track member for movable placement on a globe to simulate thereon at least part of the orbital track of an orbiting body, said orbital track member having a radius of curvature generally corresponding to the radius of the globe with which it is to be used; said orbital track member being supported by a circular support ring having an internal radius generally corresponding to the radius of the globe with which the accessory is to be used, such that the support ring will lie along a great circle on the surface of the globe and wherein said orbital track member defines a full circle so as to simulate a complete orbital track on the globe of an orbiting body, at least one of the orbital track member and support ring having a detachable coupling therein so as to facilitate mounting and dismounting of the accessory on a globe, a lateral range member having a radius of curvature generally corresponding to the radius of the globe, said lateral range member being provided with indicia and calibrated for measurement of circumferential distances on said globe; and means mounting said lateral range member for relative movement along the arc of said orbital track member but always oriented normally thereto such that the indicia calibrations on said lateral range member are always indicative of the shortest circumferential distance from said orbital track of any point on the globe lying along said lateral range member, whereby the lateral range requirement for an entry body returning from any orbit to any desired landing sight can be determined by locating the orbital track member on the globe along the orbital track, moving the lateral range member to intersect the desired landing site, and determining the calibrated distance from the orbital track member to the desired landing site along the lateral range member.

2. A device as claimed in claim 1 wherein said lateral range member is pivotally supported by said support ring at points ninety degrees from the support points of said orbital track member, and wherein said orbital track member is rigidly coupled to said support ring, such that the great circles of said support ring and said orbital track member are always normal to each other, and the great circles of said lateral range member and said orbital track are always normal to each other.

3. A device as claimed in claim 2 wherein said orbital track member and said lateral range member are both calibrated for measurement of circumferential distance on the globe such that the longitudinal and lateral ranges from any entry point along the orbital track member to any desired landing site along the lateral range member can be determined by the calibrated distances from the intersection of the orbital track member and lateral range member to the entry point and to the landing site, respectively.

4. A device as claimed in claim 3 wherein said device is formed with reference marks at the intersections of the orbital track member and the support ring for location on the equator of the globe at the nodal points for any desired orbit.

* * * * *